United States Patent
Jebara et al.

(10) Patent No.: US 12,361,052 B2
(45) Date of Patent: Jul. 15, 2025

(54) SYSTEMS AND METHODS FOR CALIBRATING RECOMMENDATIONS USING A MAXIMUM FLOW APPROACH

(71) Applicant: Spotify AB, Stockholm (SE)

(72) Inventors: Tony Jebara, Monte Sereno, CA (US); Himan Abdollahpouri, Brooklyn, NY (US); Zahra Nazari, New York, NY (US); Alexander Zachary Gain, Valrico, FL (US); Maria Dimakopoulou, Los Gatos, CA (US); Benjamin Carterette, Wilmington, DE (US); Mounia Lalmas-Roelleke, Saffron Walden (GB); Clay Gibson, Brooklyn, NY (US)

(73) Assignee: Spotify AB, Stockholm (SE)

(*) Notice: Subject to any disclaimer, the term of this patent is extended or adjusted under 35 U.S.C. 154(b) by 0 days.

(21) Appl. No.: 18/166,419

(22) Filed: Feb. 8, 2023

(65) Prior Publication Data
US 2024/0152545 A1    May 9, 2024

(30) Foreign Application Priority Data
Nov. 4, 2022 (GR) .............................. 20220100901

(51) Int. Cl.
*G06F 16/483* (2019.01)
*G06F 16/435* (2019.01)
*G06F 16/901* (2019.01)

(52) U.S. Cl.
CPC .......... *G06F 16/483* (2019.01); *G06F 16/437* (2019.01); *G06F 16/9024* (2019.01)

(58) Field of Classification Search
CPC ... G06F 16/483; G06F 16/437; G06F 16/9024
See application file for complete search history.

(56) References Cited

U.S. PATENT DOCUMENTS 6,489,968 B1 * 12/2002 Ortega .................. G06F 16/954
                                                                715/713
6,675,170 B1 *  1/2004 Flake .................. G06F 16/9558
(Continued)

OTHER PUBLICATIONS

Ahlswede et al., "Network Information Flow", IEEE (Year: 2000).*
(Continued)

*Primary Examiner* — Charles Rones
*Assistant Examiner* — Huen Wong
(74) *Attorney, Agent, or Firm* — Morgan, Lewis & Bockius LLP

(57) ABSTRACT

An electronic system stores metadata for a plurality of media items, including, for each media item of the plurality of media items, at least one categorical identifier from a set of categorical identifiers. For a user of the media-providing service, the electronic system (i) determines a distribution of interests of the user with respect to the set of categorical identifiers; (ii) generates a network graph configured to represent a calibrated media item selection task, wherein the network graph represents respective relevance scores for each respective media item of the plurality of media items and the distribution of interests of the user with respect to the categorical identifiers; (iii) selects a set of media items from the plurality of media items to recommend to the user by solving for a maximum flow of the network graph; and (iv) provides the set of media items as recommendations to the user.

18 Claims, 8 Drawing Sheets

(56) References Cited

U.S. PATENT DOCUMENTS

| | | | | |
|---|---|---|---|---|
| 7,747,748 | B2* | 6/2010 | Allen | H04N 21/2381 709/224 |
| 8,725,796 | B2* | 5/2014 | Serena | G06F 16/9535 709/204 |
| 9,053,492 | B1* | 6/2015 | Stanley | G06Q 30/0224 |
| 10,102,277 | B2* | 10/2018 | Legrand | G06F 16/3346 |
| 10,789,267 | B1* | 9/2020 | Dhoolam | G06F 16/27 |
| 10,795,895 | B1* | 10/2020 | Taig | G06F 16/24578 |
| 11,150,995 | B1* | 10/2021 | Dhoolam | G06F 16/9535 |
| 11,595,294 | B1* | 2/2023 | Shem-Tov | G06F 16/9024 |
| 11,855,866 | B1* | 12/2023 | Soha | H04L 41/145 |
| 12,056,177 | B2* | 8/2024 | Mehrotra | G06N 3/045 |
| 2002/0029243 | A1* | 3/2002 | Melet | G06Q 20/202 707/E17.107 |
| 2011/0302158 | A1* | 12/2011 | Sanders | G06F 16/9535 707/723 |
| 2013/0262588 | A1* | 10/2013 | Barak | H04L 51/52 709/204 |
| 2014/0280371 | A1* | 9/2014 | Bastide | G06F 16/35 707/803 |
| 2016/0026713 | A1* | 1/2016 | Katic | G06F 16/28 707/723 |
| 2016/0294894 | A1* | 10/2016 | Miller | G06F 16/24578 |
| 2016/0307287 | A1* | 10/2016 | Jat | G01C 21/3453 |
| 2018/0158100 | A1* | 6/2018 | Barak | H04L 67/535 |
| 2021/0311941 | A1* | 10/2021 | Zhang | G06F 16/2465 |

OTHER PUBLICATIONS

Cenciarelli et al., "Inefficiencies in network models: A graph-theoretic perspective", Sapienza University of Rome (Year: 2017).*

Viamala et al., "A Kullback-Leibler Divergence-based Fuzzy C-means Clustering for Enhancing the Potential of an Movie Recommendation System", Pondicherry Engineering College (Year: 2019).*

Mansoury et al., "A Graph-based Approach for Mitigating Multi-sided Exposure Bias in Recommender Systems", Association for Computing Machinery. (Year: 2021).*

Steck, "Calibrated Recommendations", RecSys '18, Vancouver, CA, Sep, 27, 2018, 9 pgs.

Mansoury et al., "FairMatch: A graph-based approach for improving aggregate diversity in recommender systems", Genoa, IT, May 3, 2020, 9 pgs.

Seymen et al., "A Constrained Optimization Approach for Calibrated Recommendations", ResearchGate, RecSys '21, Amsterdam, NL, Aug. 2021, 7 pgs.

Silva et al., "Introducing a Framework and a Decision Protocol to Calibrate Recommender Systems", J. ACM, vol. 1, No. 1, Article 1, Jan. 2022, 24 pgs.

* cited by examiner

500

502 Store metadata for a plurality of media items, including, for each media item of the plurality of media items, at least one categorical identifier from a set of categorical identifiers.

> 504 The set of categorical identifiers includes genres associated with media items and/or whether respective media items correspond to a musical audio track or a spoken-word audio track.

> 506 Multiple categorical identifiers corresponding to multiple genres are stored for at least one media item of the plurality of media items.

508 Determine a distribution of interests of a respective user with respect to the set of categorical identifiers.

> 510 The set of categorical identifiers includes genres associated with media items and/or whether respective media items correspond to a musical audio track or a spoken-word audio track.

512 Generate a network graph configured to represent a calibrated media item selection task, where the network graph represents respective relevance scores for each of the plurality of media items and the distribution of interests of the user with respect to the set of categorical identifiers.

> 514 Nodes of the network graph are connected by respective edges of a plurality of edges of the network graph, and determining a respective cost of each respective edge between the nodes of the plurality of nodes of the network graph.

> 516 Generating the network graph includes representing a Kullback-Liebler (KL) divergence function, corresponding to divergence from the distribution of interests of the user, to a logarithmic representation of the KL divergence function.

> 518 The network graph includes a source node and a sink node, and determining the maximum flow of the network graph includes determining one or more paths that maximize a total flow value between the source node and the sink node.
>
> (A)

512 Generate a network graph configured to represent a calibrated media item selection task, where the network graph represents respective relevance scores for each of the plurality of media items and the distribution of interests of the user with respect to the set of categorical identifiers.

518 The network graph includes a source node and a sink node, and determining the maximum flow of the network graph includes determining one or more paths that maximize a total flow value between the source node and the sink node.

(A)

520 The network graph includes (i) a plurality of first nodes between the source node and the sink node, wherein each first node of the plurality of first nodes represents a respective slot of the predetermined number of slots, and (ii) a plurality of second nodes between the source node and the sink node, wherein each second node of the plurality of second nodes represents a respective media item of the plurality of media items that can be selected for one of the respective slots of the predetermined number of slots.

522 The network graph includes a plurality of third nodes between the second plurality of nodes and the sink node, wherein each third node is connected to a single second node of the plurality of second nodes.

524 The network graph includes first edges between the source node and the sink node, the first edges having respective costs determined by the respective relevance scores; and second edges between the source node and the sink node, the second edges having costs that are based on the distribution of interests of the user with respect to the set of categorical identifiers.

526 The first edges connect each of the plurality of first nodes with each of the plurality of second nodes, and the second edges connect each of the plurality of third nodes with the sink node.

528 A first weighting is applied to the respective costs of the first edges, and a second weighting, distinct from the first weighting, is applied to the respective costs of the second edges.

530 Select a set of media items from the plurality of media items to recommend to the user based on a determination that the set of media items maximizes a flow through the network graph.

> 532 The set of media items has a predetermined number of slots, and selecting the set of media items includes selecting a single media item for each slot of the predetermined number of slots.

534 Provide the set of media items as recommendations to the user.

> 536 The set of media items is provided to the user within a single user interface element.
>
>> 538 While the user is playing back the set of media items, automatically, and without further instruction from the user, regenerate the network graph, and causing another set of media items to be provided to the user.

540 After receiving an indication that the user has caused playback of one or more media items, include at least one media item from the set of media items provided as recommendations to the user, causing an adjustment to the network graph.

> 542 The adjustment includes adjusting the value of a hyperparameter that modifies costs associated with edges corresponding to one or more of (i) relevance scores, and (ii) the distribution of interests of the user.

544 After adjusting the network graph, and based on a determination that the hyperparameter meets threshold conditions, regenerating the network graph based on an updated distribution of interests of the user.

FIG. 5C

SYSTEMS AND METHODS FOR CALIBRATING RECOMMENDATIONS USING A MAXIMUM FLOW APPROACH

PRIORITY APPLICATION

This application claims priority to Greek Application No. 20220100901, filed Nov. 4, 2022, which is hereby incorporated by reference in its entirety.

TECHNICAL FIELD

This relates generally to recommending content to users of media-providing services, and more particularly to, systems and methods for providing calibrated recommendations to users using a maximum flow approach.

BACKGROUND

Recent years have shown a remarkable growth in consumption of digital goods, such as musical audio tracks and spoken-word audio recordings. The large number of these digital goods (e.g., media items) often makes navigation and discovery difficult. Recommendation services, which provide recommendations to users, serve a key role in alleviating this problem.

Calibration is a technique for providing recommendations that are representative and in proportion to users' interests. Consider a user who listens to rock music 80% of the time, and rhythm and blues music 20% of the time. A system designed to optimize for relevance alone (e.g., by independently maximizing the likelihood that each recommendation is of interest to the user) would provide exclusively rock music. Thus, a system that optimizes for relevance alone is said to be uncalibrated, in that such a system does not account for the users' minority interests.

Existing formulations of the calibration problem are NP-hard, and thus lack a polynomial-time solution. That is, they cannot be determined within an upper bound of acceptable computation time for most commercial computing applications. Therefore, improved systems and methods are needed for efficiently optimizing recommendations while calibrating for distributions of users' interests.

SUMMARY

The systems and methods described herein provide efficient techniques for providing calibrated recommendations by generating network graphs representing objective functions for providing calibrated recommendations to users, and then solving for the maximum flow/minimum cost of the network graph. The network graphs represent respective relevance scores and the distributions of interests of respective users and/or sets of users based on sets of categorical identifiers (e.g., a media content type, an audio-track type, a genre). Sets of media items (e.g., musical audio tracks, spoken-word audio tracks, advertisements) can be recommended to users in an efficient way via the network graphs.

To that end, in accordance with some embodiments, a method is provided for generating network graph representative of a calibration task and solving for a maximum flow (or equivalently, minimum cost) through the network graph. The method is performed at a computing device having one or more processors and memory that is associated with a media-providing service. The method includes storing metadata for a plurality of media items, including, for each media item of the plurality of media items, at least one categorical identifier from a set of categorical identifiers. The method further includes, for a respective user of the media-providing service, determining a distribution of interests of the respective user with respect to the set of categorical identifiers. The method further includes, for the respective user of the media-providing service, generating a network graph configured to represent a calibrated media item selection task. The network graph represents respective relevance scores for each respective media item of the plurality of media items and the distribution of the interests of the user with respect to (e.g., across, from among) the categorical identifiers. The method further includes selecting a set of media items from the plurality of media items to recommend to the user based on a determination that the set of media items maximizes a flow through the network graph. The method further includes providing the set of media items as recommendations to the user.

In accordance with some embodiments, an electronic device is provided. The electronic device includes one or more processors and memory storing one or more programs. The one or more programs include instructions for performing any of the methods described herein (e.g., the method 500).

In accordance with some embodiments, a non-transitory computer-readable storage medium is provided. The non-transitory computer-readable storage medium stores one or more programs for execution by an electronic device with one or more processors. The one or more programs comprise instructions for performing any of the methods described herein (e.g., the method 500).

Thus, systems are provided with improved methods for providing calibrated recommendations using a maximum flow/minimum cost approach.

BRIEF DESCRIPTION OF THE DRAWINGS

The embodiments disclosed herein are illustrated by way of example, and not by way of limitation, in the figures of the accompanying drawings. Reference numerals refer to corresponding parts throughout the drawings and specification.

FIGS. 5A-5C are flow diagrams illustrating an example method for selecting a set of calibrated media items based on a distribution of a user's interest and the relevance of the respective media items, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms "first," "second," etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
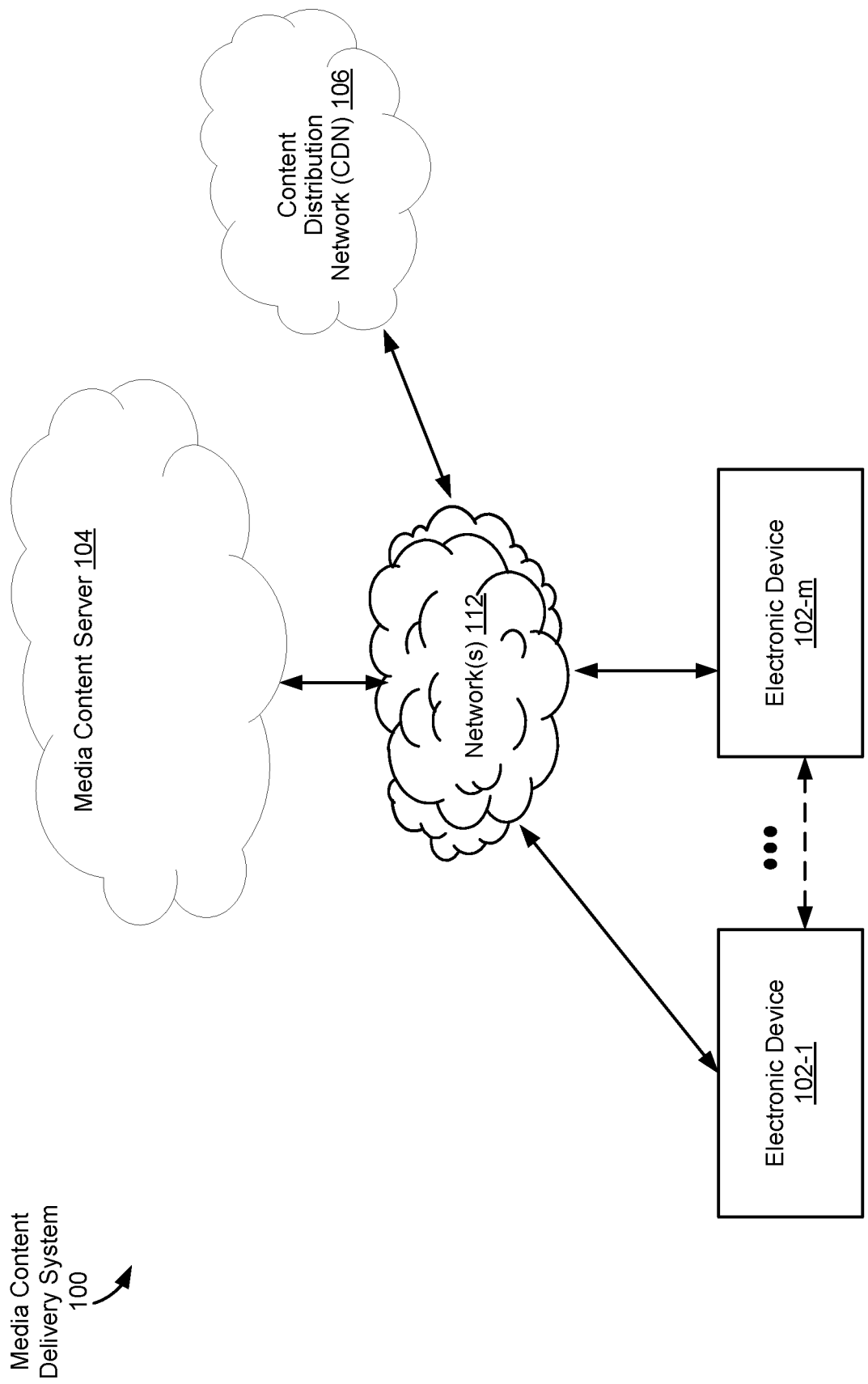
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks, local area networks, virtual private networks, metropolitan area networks, peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, infotainment system, digital media player, a speaker, television (TV), and/or any other electronic device capable of presenting media content (e.g., controlling playback of media items, such as musical audio tracks, spoken-word audio tracks, videos). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., Bluetooth/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, audiobooks, etc.), video (e.g., short-form videos, music videos, television shows, movies, clips, previews, etc.), text (e.g., articles, blog posts, emails), image data (e.g., image files, photographs, drawings, renderings), games (e.g., two- or three-dimensional graphics-based computer games), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice application programming interface ("API"), a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer or multiple server computers. Moreover, the media content server 104 may be coupled to CDN 106 and/or other servers and/or server systems, or other devices, such as other client devices, databases, CDNs (e.g., peer-to-peer networks), network caches, and the like. In some embodiments, the media content server 104 is implemented by multiple computing devices working together to perform the actions of a server system (e.g., cloud computing).

Figure 2:
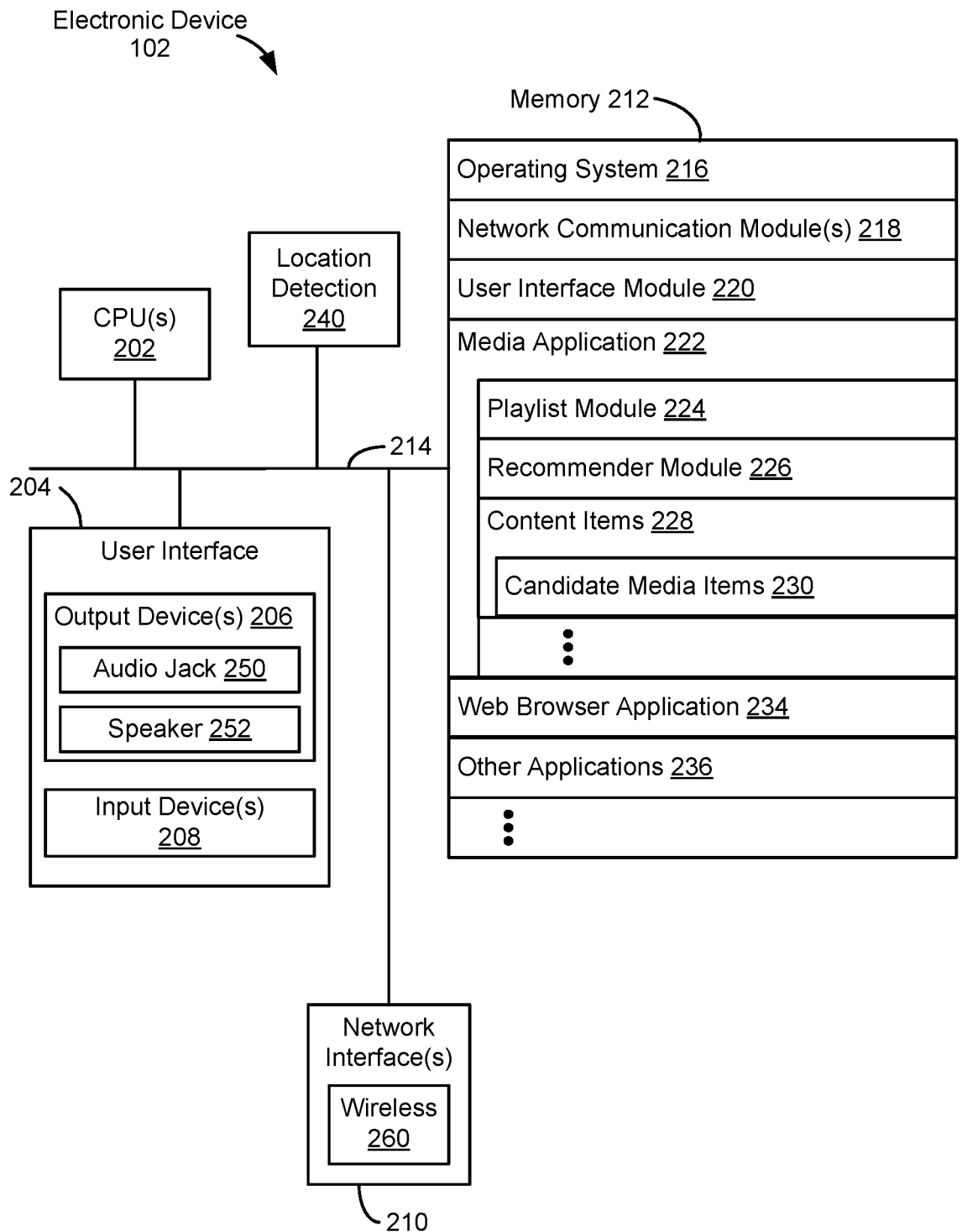
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track-pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice-recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;
  network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a playlist module 224 for storing sets of media items for playback in a predefined order, the media items selected by the user (e.g., for a user-curated playlist) and/or the media items curated without user input (e.g., by the media content provider);

a recommender module 226 configured to perform operations, including calibration, for providing media items to a user based on the relevance of the media items to the user's listening history; and a content items module 228 for storing media items, including audio items such as podcasts and songs, for playback and/or for forwarding requests for media content items to the media content server; and a candidate media items module 230 for storing a subset of media items, including musical audio tracks and spoken-word audio tracks, for providing to a network graph to determine a set of media items to recommend to a user.

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
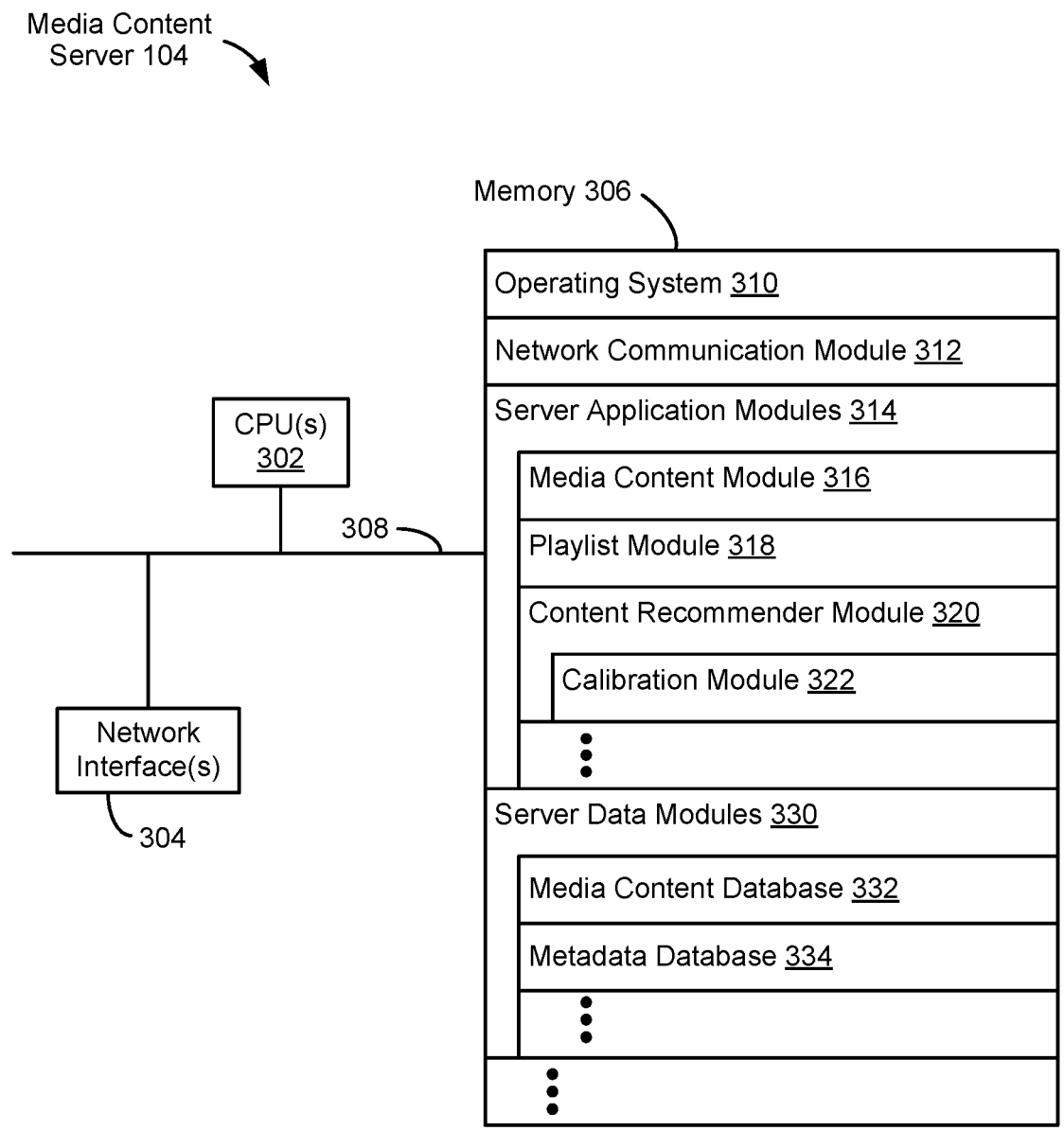
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content module 316 for storing one or more media content items and/or sending (e.g., streaming), to the electronic device, one or more requested media content item(s);

a playlist module 318 for storing and/or providing (e.g., streaming) sets of media content items to the electronic device;

a content recommender module 320 configured to perform operations for providing media items to a user based on the relevance of the media items to the user's listening history; and a calibration module 322 configured to calibrate recommendations provided to a user based on a distribution of the user's interests.

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items (e.g., categorical identifiers of a set of categorical identifiers, including a genre associated with the respective media items).

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
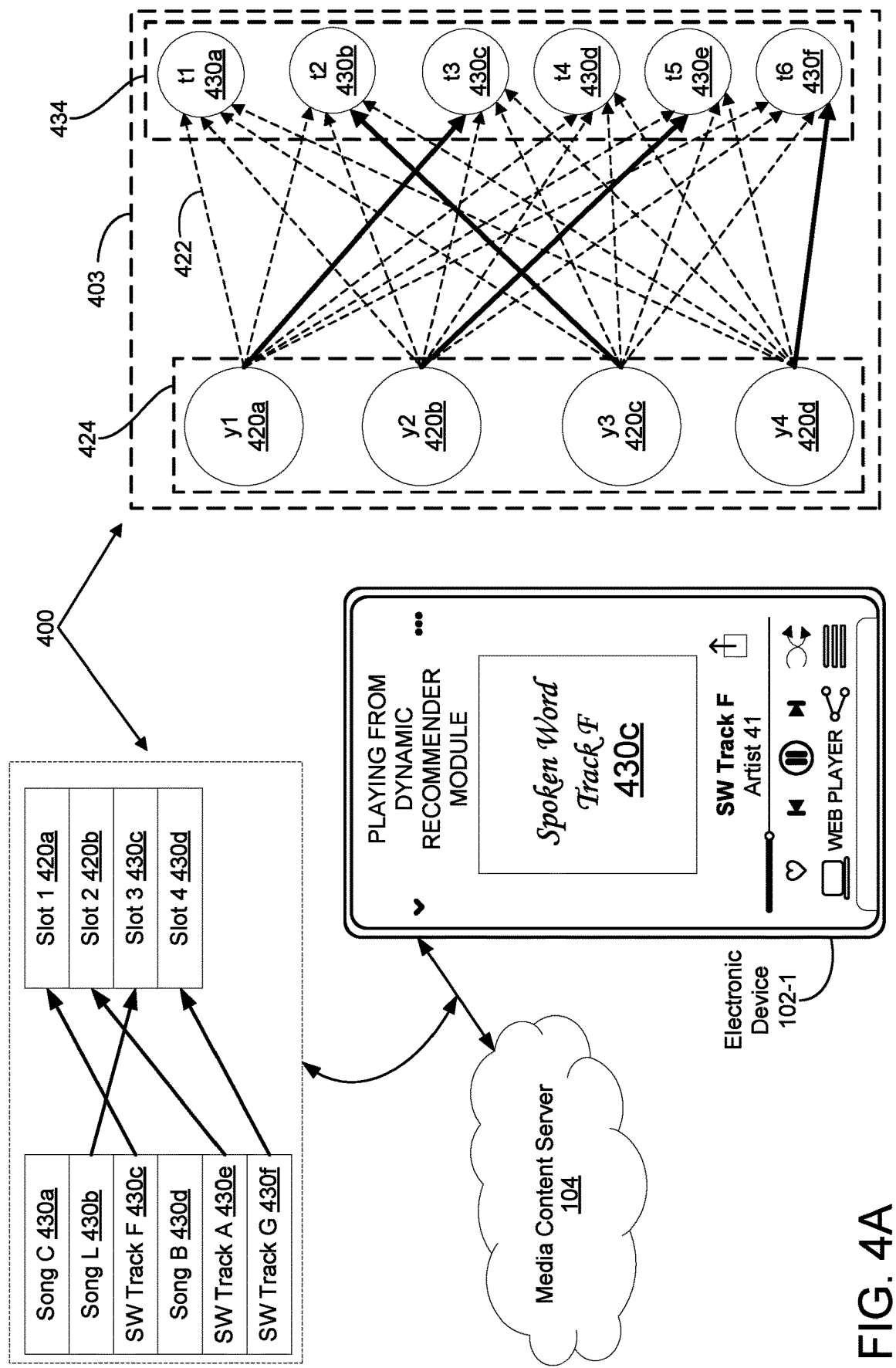
FIGS. 4A-4B are schematic diagrams illustrating an example computing system that can select a calibrated set of media items to recommend to a user, in accordance with some embodiments.
Figure 4B:
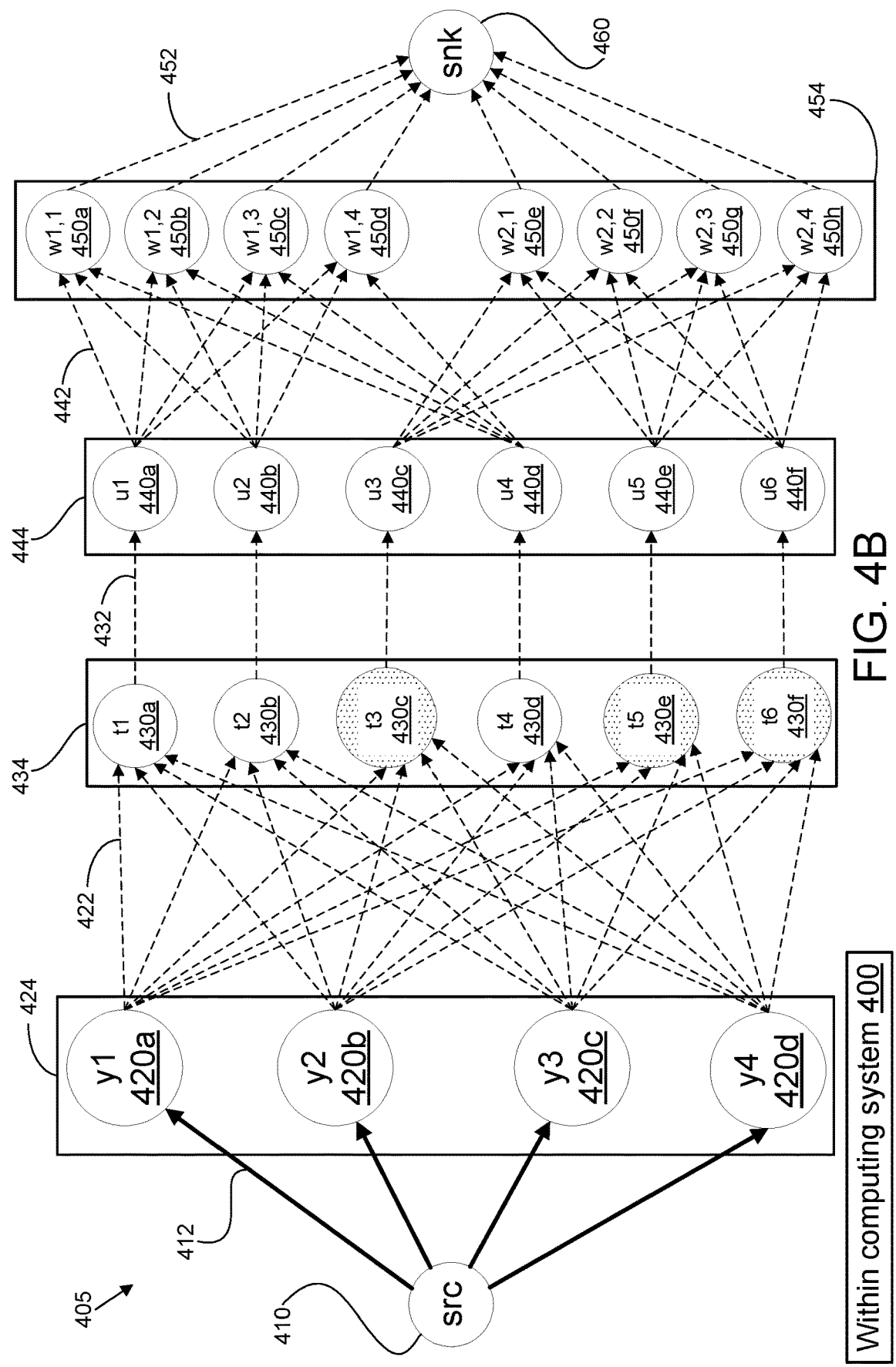

FIGS. 4A-4B are schematic diagrams illustrating a computing system 400 that can select a calibrated set of media items to recommend to a user, in accordance with some embodiments. The computing system 400 can include the electronic device 102-1 in electronic communication with a media-providing service (the media content server 104 in FIG. 1). A user of the electronic device 102-1 can cause a media application (e.g., the media application 222 in FIG. 2) to provide playback of media items, including musical audio tracks, and spoken-word audio tracks (e.g., a media item 430c ("Spoken Word Track F")).

In some embodiments, a set of media items to be recommended to a user has a predetermined number of slots 420a-420d. In some embodiments, a media item selected for each respective slot of the slots 420a-420d can be one or more media items from a plurality of media items 430a-430f. The plurality of media items 430a-430f can include all media items available from the media-providing service, or a subset, less than all, of the media items available from the media-providing service. Such operations can optionally be performed before and/or after the plurality of media items 430a-430f have been input to the network graph 405.

FIG. 4A illustrates an example computing system 400 that includes the plurality of media items 430a-430f, and the set of slots 420a-420d. One of ordinary skill in the art will understand that FIG. 4A depicts certain details of the computing system 400 that can be used in conjunction with the network graph 405 shown in FIG. 4B but does not necessarily include each component and/or implementation detail of the network graph 405.

In some embodiments, a set of media items is determined and represented as a binary matrix M of size m×n, where, if $M_{ij}=1$, then an item i (e.g., the media item 430c) goes into a slot j (e.g., the slot 420c) one time. In some embodiments, the set of media items must fully pack each slot (e.g., one media item must be occupying each slot 420a-420d), and never double-pack any of the slots.

$\sum_{j=0}^{n-1} M_{ij} \leq 1$ Equation 2. Each item should be put in a slot at most once.

$\sum_{i=0}^{m-1} M_{ij} = 1$ Equation 3. Each slot should be filled by one item.

The optimal packing of the slots of the set of media items can be expressed as a result M* of a maximum weight assignment equation:

$$M^* = \underset{M}{\mathrm{argmax}} \sum_{i=1}^{m} \sum_{j=1}^{n} M_{ij} A_{ij}.$$  Equation 4

In this equation, $A_{ij}$ represents the value (e.g., based on a relevance) of selecting a media item i (e.g., one media item of the plurality of media items 430a-430f) to fill one of the slots j (e.g., one of the slots 420a-420d). Equation 4 above can be modeled in a graph structure (e.g., which can be at least a portion of a network graph (e.g., a bipartite graph structure)) as shown in the graph view 403. In the graph view 403, a plurality of nodes 434 correspond to the plurality of media items 430a-430f. Respective values of $A_{ij}$ between the respective nodes of the plurality of nodes 424 can be considered respective costs (which can be represented as edges (e.g., an edge 422)), based on the relevance of the media item to the user's interactions with the media-providing service (e.g., aspects of the user's listening history). In some embodiments, the value of the edge 422 is proportional to $A_{ij}$.

FIG. 4B illustrates a network graph 405, which represents a calibrated media item selection task through which media items are selected using a maximum flow approach. One of skill in the art, having the benefit of the disclosure, will understand that network graph 405 is just one example of such a graph. In various embodiments, similar graphs may be constructed in a different manner (e.g., with different layers and/or different connections between layers). The particular example represented by the network graph 405 is a flow network through which determination of the maximum flow represents selection of a calibrated set of media items. In some embodiments, determining the maximum flow across the network 405 is based on determining the minimum cut (e.g., cost) of sending n units of flow across the network 405 (where n corresponds to the number of slots 420a-420d). One of skill in the art, having the benefit of the disclosure, will understand that there can be multiple techniques for determining the maximum flow across the network graph 405. For example, using a Floyd-Fulkerson method, determining the maximum flow across the network graph 405 can include (i) determining a pseudo-flow across the network graph 405 based on a first set of constraints, (ii) determining a residual capacity of the network (e.g., a residual network) based on the pseudo-flow, and (iii) iteratively optimizing the pseudo-flow (e.g., canceling and/or replacing pseudo-flow) based on minimizing the residual capacity to achieve a maximum feasible flow across the network graph 405. One of skill in the art will recognize that various embodiments of the network graph 405 can employ different techniques than the above-mentioned method.

The network graph 405 can be generated by one or more electronic devices of the computing system 400 (e.g., the media content server 104 and/or the electronic device 102-1). The network graph 405 can be used to select a set of media items to recommend to a user, which can correspond to the slots 420a-420d, based on both the relevance of the media items and a correspondence between a distribution of the set of media items, based on a set of categorical identifiers (e.g., a media content type, an audio-track type, a genre), and a distribution of interests of a user (e.g., the user of the electronic device 102-1).

To calibrate the set of media items provided to the user based on the distribution of interests of the user, the slots 420a-420d are to be occupied by media items from the plurality of media items 430a-430f. The media items that occupy the slots 420a-420d together have a distribution across a set of categorical identifiers that is based on (e.g., equal to, or as close as possible to, matching) the distribution of interests of the user.

In some embodiments, at least one content category (e.g., genre) that a respective media item (e.g., of the plurality of media items 430a-430f) belongs to can be represented by another matrix m×c called G, where $G_{ik}$ indicates whether a media item i (a media item selected for one of the slots 420a-420d) belongs to a particular category k (e.g., has a particular categorical identifier of a set of categorical identifiers). In some embodiments, the indication includes a value in a respective index of the matrix G (e.g., one or zero).

One of skill in the art will appreciate that there are multiple methodologies for modifying the matrix G, based on a determination that a media item of the plurality of media items 430a-430f is associated with more than one category. In some embodiments, if a media item (e.g., the media item 430a ("Song C")) corresponds to more than one category, each corresponding index for that category is assigned a full value for that category (e.g., the media item is indicated as being a rock song, and a rhythm and blues song, as would be the case if it was any one of those genres individually). In some embodiments, a media item that corresponds to multiple categories can cause an index to include one or more partial values.

Given a potential solution M* that is based on a relevance of the candidate media items, an example distribution of the content categories k can be represented as:

$$q(k) = \frac{1}{n}\sum_{i=1}^{m}\sum_{j=1}^{n} G_{ik} M_{ij}. \quad \text{Equation 5}$$

To penalize (e.g., associate a cost with) a potential solution M* (e.g., the determination of the set of media items corresponding to the slots 420a-420d in FIG. 4A) based on an amount by which the distribution q of the set of selected media items deviates from a distribution (p) that corresponds to the distribution of interests of the user, the objective function expressed via Equation 4 can be modified to account for a penalty (e.g., a cost). In some embodiments, the penalty can grow (e.g., the amount of divergence can be used as a weighting applied to the cost) as divergence D (q∥p) grows (e.g., using Kullback-Liebler divergence):

$$M^* = \underset{M}{\operatorname{argmax}}(1-\lambda) \times \sum_{i=1}^{m}\sum_{j=1}^{n} M_{ij} A_{ij} - \lambda \sum_{k=1}^{c} q(k)\log\frac{q(k)}{p(k)}. \quad \text{Equation 6}$$

In some embodiments, to generate a network graph (e.g., a network graph 405) through which the calibration problem can be solved using a maximum flow/minimum cost approach, the computing system 400 determines an output distribution of media items of at least one category that can be provided to the objective function illustrated by Equation 6. For example, a number of media items (j) of a category (k) can be assumed to be selected, making the distribution q:

$$q(k)=j/n \quad \text{Equation 7. The distribution includes j items of category k.}$$

In some embodiments, after the computing system 400's determination of the number of media items having the categorical identifier for category k the penalty term of the objective function in Equation 6 can be written as:

$$E_{k,j} = \frac{j}{n}\log\left(\frac{j}{n}\right) - \frac{j}{n}\log(p(k)). \quad \text{Equation 8}$$

Applying the resulting term illustrated by Equation 8 (which can be interpreted as corresponding to a penalty for deviating from the user's distribution of interests), the objective function shown in Equation 6 can be written as:

$$M^* = \underset{M}{\operatorname{argmax}}(1-\lambda) \times \sum_{i=1}^{m}\sum_{j=1}^{n} M_{ij} A_{ij} - \lambda \sum_{k=1}^{c} E_{k,nq(k)}. \quad \text{Equation 9}$$

One of ordinary skill in the art will appreciate that a tuning parameter (λ) shown in Equation 9 above can be used to adjust the importance of relevance and calibration. In some embodiments, a higher value for the tuning parameter corresponds to a larger weighting being applied to costs related to miscalibration and a lower value for the tuning parameter corresponds to a larger weighting being applied to costs related to relevance. In some embodiments, one or more tuning operations can be performed based on feedback (e.g., implicit feedback, explicit feedback) from the user directed to the selected set of recommendations.

FIG. 4B illustrates the network graph 405, which represents a calibrated media item selection task, as discussed above with respect to Equations 4-9. Systems and methods described herein, including the computing system 400, can generate (e.g., cast) a network graph (e.g., a network graph 405). Portions and/or the entire network graph can be generated at one or more of the electronic device 102-1 and/or a media content server 104. For example, the electronic device 102-1 can make a request for a set of recommendations to the media content server 104, and the request can include one or more parameters. The media content server 104 can generate the network graph 405, determine the set of selected media items, and return a response to the user. In some embodiments, the response includes a representation of the network graph 405. The computing system 400 can store metadata for each respective media item corresponding to the plurality of nodes 434, including at least one categorical identifier (e.g., whether a media item is a musical audio track or a spoken-word audio track) from a set of categorical identifiers (e.g., a media content type, an audio-track type, a genre). Each of the media items 430a-430f corresponding to the plurality of nodes 434 can be associated with a stored categorical identifier.

The network graph 405 includes a source node 410 (src) and a sink node 460 (snk). The network graph 405 includes a plurality of nodes 424 (e.g., a layer of slot nodes y1-y4) between the source node 410 and the sink node 460, which correspond to slots 420a-420d of a set of media items to provide to a user. In some embodiments, determining that the set of media items maximizes a flow through the network graph 405 includes determining (e.g., identifying) a set of paths that result in a maximum flow from the source node 410 to the sink node 460), including a set of edges (e.g., an edge 412) connecting the source node 410 to each node of the plurality of nodes 424. In some embodiments, each of the edges between the source node 410 and each respective node of the plurality of nodes 424 is a zero-cost edge. For example, the edge 412 can be a zero-cost edge. In some embodiments, the source node 410 is single connected with each node of the plurality of nodes 424.

The network graph 405 includes a plurality of nodes 434 (e.g., a layer of candidate nodes t1-t6). Each respective node of the plurality of nodes 434 corresponds to a respective media item of the plurality of media items 430a-430f (e.g., candidate media items). In some embodiments, there is a set of edges (e.g., a set of edges that includes the edge 422) that connect each node of the plurality of nodes 424 with each node of the plurality of nodes 434. In some embodiments, each edge of the set of edges connecting the plurality of nodes 424 and the plurality of nodes 434 has a cost that is determined based on the respective relevance score of the given node. In some embodiments, each edge has a cost that is equal to, or proportional to $-A_{ij}$ of the Equation 4 above (e.g., the edge 422 can have a cost of $-A_{1,1}$).

The network graph 405 includes a plurality of nodes 444 (e.g., a layer of clone nodes u1-u6), which each correspond to one media item of the plurality of media items 430a-430f. In some embodiments, there is a set of edges (e.g., a set of edges that includes the edge 432) that connects one node of the plurality of nodes 434 to one respective node of the plurality of nodes 444 (e.g., for every $i \in \{1, \ldots, m\}$, an edge connects $t_j$ to $u_j$). For example, each node of the plurality of nodes 434 can be single connected with a respective node of the plurality of nodes 444. In some embodiments, each edge of the set of edges that connect the plurality of nodes 434 with the plurality of nodes 444 includes a zero-cost edge. In some embodiments, a zero-cost edge is not associated with a cost (e.g., the costs $-A_{ij}$ and Ek, i–Ek, i–1). In some embodiments, the single-connected structure of the t-u layer ensures that each item will be picked for no more than one slot, as only a maximum flow of one is possible from $t_j$ to $u_j$.

The network graph 405 includes n nodes corresponding to a plurality of nodes 454 (e.g., a layer of calibration nodes). A number n of the plurality of nodes 454 corresponds to the number of slots 420a-420d multiplied by the number of distinct categorical identifiers of the set of categorical identifiers (e.g., a number of distinct genres across the plurality of media items 430a-430f). In some embodiments, for each media item $j \in \{1, \ldots, m\}$, if the media item belongs to category k, the computing system adds zero-cost edges from $u_j$ to all the n category nodes $w_{k,i}$ (e.g., a plurality of nodes 450a-450h) corresponding to the category k. For example, the node t3 corresponding to the media item 430-c, being in the second category, has respective zero-cost edges connecting the node t3 to each of the nodes 450e-450h (e.g., nodes $w_{2,1}$-$w_{2,4}$).

Each of the nodes 450a-450h of the plurality of nodes 454 can be connected by an edge (e.g., an edge 452) to the sink node 460 (snk). In some embodiments, the cost of each respective edge from the plurality of nodes 450a-450h corresponds to $E_{k,i}-E_{k,i-1}$, where each $E_{k,j}$ corresponds to the penalty term discussed with respect to Equation 8. For example, the weight of each edge of a set of edges that includes the edge 452 can have costs based on the distribution of interests of a respective user of the electronic device 102-1. In some embodiments, there can be additional layers of the network graph 405 representing different aspects of the user's distribution of interests (e.g., one layer can represent genre, and one layer can represent media content type). In some embodiments, one set of edges can account for more than one aspect of the user's distribution of interests.

In some embodiments, the total amount of flow that is capable of flowing through the network graph is proportional to the number of slots of the set of media items to be recommended to the user. For example, one unit of flow can be sent through the network graph for each of the slots of the network graph 405.

In some embodiments, for a given category k, the network graph 405 determines a number of slots should contain media items associated with the category k, such that the overall distribution of the set of media items is as close as possible to matching the distribution of interests of the user (e.g., the solution M contains nq(k) media items having a categorical identifier matching the category k). In some embodiments, each nodes of the plurality of nodes 454 receives one unit of flow if it is one of the first n nodes of the plurality of nodes 454 that correspond to the category k. In some embodiments, the remaining nodes of the plurality of nodes 454 that correspond to the category k receive no flow. In some embodiments, the total cost for all of the edges between the nodes of the plurality of nodes 454 that are receiving flow, and the sink node 460, can be expressed by the following equation:

$$\Sigma_{i=1}^{nq(k)}(E_{k,i}-E_{k,i-1})=E_{k,nq(k)}-E_{k,0}=E_{k,ng(k)} \qquad \text{Equation 10.}$$

FIGS. 5A-5C are flow diagrams illustrating a method 500 for selecting a set of media items to a user based on a distribution of a user's interest and the relevance of the respective media items, in accordance with some embodiments. Method 500 can be performed at an electronic device (e.g., media content server 104 and/or electronic client device(s) 102) having one or more processors and memory storing instructions for execution by the one or more processors. In some embodiments, one or more of the operations of the method 500 occur at a client device, a server, a combination of both, etc. In some embodiments, the method 500 is performed by executing instructions stored in the memory (e.g., memory 212, FIG. 2; memory 306, FIG. 3) of the electronic device 102-1. In some embodiments, the method 500 is performed by a combination of the server system (e.g., including media content server 104 and CDN 106) and a client device (e.g., the electronic device 102-1). In some embodiments, one or more of the operations of the method 500 are performed by a content recommender module of the electronic device (e.g., the content recommender module 320 in FIG. 3, which can include the calibration module 322).

Referring now to FIG. 5A, in performing the method 500, the electronic device stores (502) metadata for a plurality of media items (e.g., a collection of candidate media items, the plurality of media items 430a-430f in FIGS. 4A-4B), including, for each media item of the plurality of media items, at least one categorical identifier from a set of categorical identifiers (e.g., a categorical identifier corresponding to rap music from a set of categorical identifiers corresponding to genres of media items). In some embodiments, the plurality of media items includes a subset, less than all, of the media items available at the electronic device (e.g., the candidate media items module 230 of the content items module 228 shown in FIG. 2, a subset of the media items in the media content database 332 in FIG. 3). In some embodiments, the plurality of media items is a set of candidate media items that has been pre-processed (e.g., reduced based on the user's interests, deduplication and/or grouping of similar media items).

In some embodiments, the set of categorical identifiers includes (504) genres associated with media items and/or whether respective media items correspond to a musical audio track or a spoken-word audio track. In some embodiments, multiple categorical identifiers corresponding to multiple genres are stored (506) for at least one media item of the plurality of media items. In some embodiments, an aggregate value (e.g., a score and/or multi-class data structure) can be stored representing multiple aspects of the distribution of interests of the user. For example, a media item of the plurality of media items (e.g., the media item 430c in FIGS. 4A-4B) can have a categorical identifier that identifies the media item as having a media content type of "spoken-word audio track," and another categorical identifier that identifies the media item as having a genre of "comedy."

The electronic device determines (508) a distribution of interests of a respective user with respect to (e.g., across, from among) the set of categorical identifiers. In some embodiments, the set of categorical identifiers includes (510) genres associated with media items and/or whether respective media items correspond to a musical audio track or a spoken-word audio track. In some embodiments, the distribution of interests is based on an aggregation of a plurality of sets of categorical identifiers. For example, the distribution of interests can be based on an aggregation of the audio-track type (e.g., a media content type, an audio-track type, a genre) and the genre (e.g., rock, pop, comedy).

In some embodiments, respective media items of users' listening histories can have respective weightings based on the recency of the respective media items in the listening histories. For example, a more recent media item can be given more weight in determining a user's distribution of interests. As another example, a low confidence level can be applied to a user's account based on the relative maturity of the user's listening history. The user can have recently joined a platform associated with a media-providing service for which the listening history was stored, and therefore it is less likely that the user's listening history has fully matured to reflect an accurate distribution of interests of the user.

The electronic device generates (512) a network graph (e.g., the network graph 405 in FIG. 4B) that is configured to represent a calibrated media item selection task, where the network graph represents respective relevance scores for each media item of the plurality of media items and the distribution of interests of the user with respect to the set of categorical identifiers. For example, the network graph 405 in FIG. 4B has a set of edges that connect the plurality of nodes 424 with the plurality of nodes 434 (e.g., the edge 422), and this set of edges can have a cost that corresponds to the relevance of the media item corresponding to the respective node of the plurality of nodes 434. Further, the network graph 405 has a set of edges that includes the edge 452 that connect the plurality of nodes 450a-450h, and this set of edges can have a cost that corresponds to the distribution of the user's interests.

In some embodiments, nodes of the network graph are (514) connected by respective edges of a plurality of edges of the network graph and determining a respective cost (e.g., penalty, a cut) of each respective edge between the nodes of the plurality of nodes of the network graph. In some embodiments, the cost of an edge can be zero. The plurality of edges can include one or more zero-cost edges (e.g., an edge having a cost of zero). For example, the set of edges that includes the edge 412, and the set of edges that includes the edge 432 can be zero-cost edges, in accordance with some embodiments. In some embodiments, determining a respective cost of a respective edge includes assigning a cost of zero to the respective edge.

In some embodiments, generating the network graph includes representing (516) a Kullback-Liebler (KL) divergence function, corresponding to divergence from the distribution of interests of the user, to a logarithmic representation of the KL divergence function. For example, the network graph 405 represents an objective function with a solution M*, shown in Equation 6, which includes a KL divergence penalty term. In some embodiments, as part of representing the KL divergence function as a network graph one or more of (i) a total number of categories is identified, and/or (ii) a number of slots corresponding to recommendations for at least one category is identified.

In some embodiments, the network graph includes (518) a source node (e.g., the source node 410 in FIG. 4B) and a sink node (e.g., the sink node 460 in FIG. 4B), and determining the maximum flow of the network graph includes determining (e.g., solving for, identifying) one or more paths that maximize a total flow value between the source node and the sink node. In some embodiments, a path is a set of edges between a source node and a sink node of the network graph (e.g., any of the edges 412, 422, 432, 442, and 452).

Turning now to FIG. 5B, in some embodiments, the network graph includes (520): (i) a plurality of first nodes between the source node and the sink node, wherein each first node of the plurality of first nodes represents a respective slot of the predetermined number of slots (e.g., the plurality of nodes 424 in FIGS. 4A-4B), and (ii) a plurality of second nodes between the source node and the sink node, wherein each second node of the plurality of second nodes represents a respective media item of the plurality of media items (e.g., the plurality of nodes 434 that represent the plurality of media items 430a-430f in FIGS. 4A-4B) that can be selected for one of the respective slots of the predetermined number of slots. In some embodiments, each respective media item of the plurality of first nodes is coupled to the source node (e.g., via the set of edges that includes the edge 412 in FIG. 4B). In some embodiments, the plurality of first nodes comprises a layer of the network graph.

In some embodiments, selecting the set of media items to recommend to the user based on a determination that a set of media items maximizes the flow through the network graph includes determining a plurality of paths through the network graph. Each of the plurality of paths connects a respective first node representing a slot to a single second node representing a candidate media item. In accordance with a determination that a respective path of the plurality of paths connects a respective first node representing a slot to a respective second node representing a media item, the media item is selected for the slot. In some embodiments, each first node is located along a single path and each second node is located along at most a single path (i.e., each slot is filled with a single media item, and no media item is repeated), as expressed by Equations 2 and 3 above.

In some embodiments, the network graph includes (522) a plurality of third nodes (e.g., a layer of clone nodes; the plurality of nodes 444 in FIG. 4B) between the second plurality of nodes and the sink node. Each third node can be connected to a single second node of the plurality of second nodes. In some embodiments, each third node is singly connected to a distinct second node.

In some embodiments, a third set of edges (e.g., the set of edges that includes the edge 432) between each second node and each third node results in the network graph selecting a respective media item of the plurality of media items to recommend to the user no more than once (e.g., the set of edges that includes the edge 432). In some embodiments, each third edge has the same cost, which can be zero or non-zero. That is, the third set of edges can be configured to singly connect a second plurality of nodes to a third plurality of nodes without biasing the selection of media items, which can be the case even when the set of third edges are not zero-cost edges.

In some embodiments, the network graph includes (524) first edges (e.g., the set of edges that includes the edge 422) between the source node and the sink node, the first edges having respective costs determined by the respective relevance scores, and second edges (e.g., the set of edges that includes the edge 452) between the source node and the sink node, the second edges having costs that are based on the distribution of interests of the user with respect to the set of categorical identifiers. In some embodiments, a hyperparameter is applied to the network graph to modify the first weighting and/or the second weighting, in real time. In some embodiments, one or more of the weightings can be based on aspects of the listening history of the user. For example, if the user tends to explore new genres besides a primary genre, then the weighting applied to edges for calibrating the distribution of interests can be relatively lower than the weighting applied to edges for maximizing the relevance of the recommendations.

In some embodiments, the first edges connect (526) each of the plurality of first nodes with each of the plurality of second nodes (e.g., the set of edges that includes the edge 422), and the second edges connect (either directly or indirectly) each of the plurality of third nodes with the sink node. That is, the edges connecting each of the second edges to the sink node can be connected to intermediate nodes. In some embodiments, the network graph is unidirectional, meaning that flow goes in one direction across the network graph.

In some embodiments, a first weighting is (528) applied to the respective costs of the first edges, and a second weighting, distinct from the first weighting, is applied to the respective costs of the second edges. For example, a hyperparameter can be tuned to place more importance on relevance than on a distribution of interests of a respective user, which can cause a higher weighting to be placed on costs corresponding to relevance (e.g., the costs of the set of edges that includes the edge 412) than another weighting applied to costs corresponding to the distribution of interests of the user (e.g., the costs of the set of edges that includes the edge 452).

Turning now to FIG. 5C, the electronic device selects (530) a set of media items (e.g., the media items selected for the slots 420a-420d in FIGS. 4A-4B) from the plurality of media items (e.g., from the candidate media items module 230 shown in FIG. 2) to recommend to the user based on a determination that the set of media items maximizes a flow through the network graph (e.g., a set of media items that optimizes a maximum flow network and/or a minimum cut network).

In some embodiments, after being selected, one or more media items of the set of media items are provided to the user. In some embodiments, after being selected, one or more media items of the set of media items are streamed to the user. In some embodiments, the stream of media items that includes one or more media items of the set of media items is provided without further instruction from the user (e.g., the user provides a vocal command to "Play music" and the media providing service provides one of the recommended media items to the user without the user expressly selecting the media item). In some embodiments, one or more of the set of media items are provided to the user as a representation within a user interface displayed at a display of the electronic device 102-1 (e.g., "Your Daily Recommendations"). In some embodiments, a respective media item of the set of media items recommended to the user is streamed in response to a user input selecting a representation of the respective media item.

In some embodiments, the set of media items (532) has (e.g., corresponds to) a predetermined number of slots (e.g., the slots 420a-420d in FIGS. 4A-4B), and selecting the set of media items includes selecting a single media item for each slot of the predetermined number of slots (e.g., no slot is double-packed, triple-packed). In some embodiments, each slot is associated with exactly one media item of the set of media items, and each media item of the set of media items can be associated with only one slot of the predetermined number of slots. In some embodiments, the method selects media items to be placed in slots for providing recommendations to the user. That is, the set of media items that is provided to the user as recommendations is that set of media items selected for the slots.

The electronic device provides (534) the set of media items as recommendations to the user. In some embodiments, the set of media items is (536) provided to the user within a single user interface. In some embodiments, while (538) the user is playing back the set of media items, the electronic device automatically, and without further instruction from the user, regenerates the network graph, and causes another set of media items to be provided to the user. In some embodiments, the network graph is regenerated based on feedback provided by the user to one or more of the set of media items recommended to the user. For example, the user can skip the first three songs of the set of media items that was recommended to the user and based on the explicit feedback of the user skipping the songs, the electronic device can cause a new network graph to be generated that applies adjusted weights to different aspects of the distribution of interests of the user.

In some embodiments, the method further includes, after (540) receiving an indication that the user has caused playback of one or more media items, at least one media item from the set of media items provided as recommendations to the user, causing an adjustment to the network graph. In some embodiments, the adjustment includes adjusting (542) the value of a hyperparameter that modifies costs associated with edges corresponding to one or more of (i) relevance scores, and (ii) the distribution of interests of the user. For example, if a user's feedback to the set of media items that was recommended to the user indicates that a current distribution of interests (e.g., a current listening session of the user) of the user is not indicative in some way to the distribution of interests of the user based on the user's listening history, then the hyperparameter can be adjusted to more heavily weight relevance of respective media items, and/or a particular aspect of the user's distribution of interests that is more reflective of their current distribution of interests. For example, a user's listening history can indicate that the user has a tendency to listen to more rock songs, but the user's current listening session can indicate that the user has more interest in listening to popular songs of a variety of different categories. The hyperparameter can be tuned such that the weighting between relevance and distribution remains the same, but that the distribution of media content types of respective media items is given more weight than the distribution of genres of respective media items.

In some embodiments, the method further includes, after (544) adjusting the network graph, and based on a determination that the hyperparameter meets threshold conditions, regenerating the network graph based on an updated distribution of interests of the user. For example, a determination that the hyperparameter has been modified by a threshold value compared to the original value or set of values corresponding to the hyper parameter can indicate that the network graph is no longer providing proper calibration techniques, or that the hyperparameter is driving the recommendation process to such an extent that the maximum flow of the network graph has been reduced by a threshold value.

Although FIGS. 5A-5C illustrate various logical stages in a particular order, stages that are not order-dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments with various modifications as are suited to the particular use contemplated.

What is claimed is:

1. A method performed at a first electronic device associated with a media-providing service, comprising:
storing metadata for a plurality of media items, including, for each respective media item of the plurality of media items, at least one genre from a set of genres associated with the plurality of media items;
for a user of the media-providing service:
determining a distribution of interests of the user, including a distribution of genres of media items in the user's listening history;
generating a network graph configured to represent a calibrated media item selection task with respect to the distribution of interests, including the distribution of genres of the media items in the user's listening history, wherein the network graph includes:
a source node;
a sink node;
a layer of nodes between the source node and the sink node representing each respective media item of the plurality of media items;
a first set of edges coupled to the layer of nodes that represents respective relevance scores for each respective media item of the plurality of media items; and
a second set of edges between the source node and the sink node that represents the distribution of interests of the user, including the distribution of genres of media items in the user's listening history;
selecting a calibrated set of media items, that is calibrated so as to be proportional to the distribution of genres, from the plurality of media items to recommend to the user based on a determination that the set of media items maximizes a flow through the network graph, using a maximum-flow approach, from the source node to the sink node; and
providing the calibrated set of media items as recommendations to the user.

2. The method of claim 1, wherein:
nodes of a plurality of nodes of the network graph are connected by respective edges of a plurality of edges of the network graph, and the method further comprises:
determining a respective cost of each respective edge between the nodes of the plurality of nodes of the network graph.

3. The method of claim 1, wherein:
determining that the set of media items maximizes the flow through the network graph includes determining a set of paths that result in a maximum flow from the source node to the sink node.

4. The method of claim 1, wherein:
the set of media items has a predetermined number of slots; and
the selecting the set of media items includes selecting a single media item of the set of media items for each slot of the predetermined number of slots.

5. The method of claim 4, wherein:
the network graph includes a plurality of first nodes between the source node and the sink node, wherein each first node of the plurality of first nodes represents a respective slot of the predetermined number of slots; and
the network graph includes a plurality of second nodes between the source node and the sink node, wherein each second node of the plurality of second nodes represents a candidate media item of the plurality of media items.

6. The method of claim 5, wherein:
the network graph includes a plurality of third nodes between the second plurality of nodes and the sink node, wherein each third node is connected to a single second node of the plurality of second nodes.

7. The method of claim 6, wherein:
the first set of edges connect each of the plurality of first nodes with each of the plurality of second nodes; and
the second set of edges connect each of the plurality of third nodes with the sink node.

8. The method of claim 6, wherein:
a first weighting is applied to respective costs of the first set of edges; and
a second weighting, distinct from the first weighting, is applied to the respective costs of the second set of edges.

9. The method of claim 1, wherein generating the network graph includes representing a Kullback-Liebler (KL) divergence function, corresponding to divergence from the distribution of interests of the user, to a representation of the KL divergence function.

10. The method of claim 1, wherein:
a first media item of the plurality of media items corresponds to a musical audio track;
a second media item of the plurality of media items corresponds to a spoken-word audio track; and
the distribution of interests of the user is further based on a set of categorical identifiers that identify respective media items as one of musical audio tracks or spoken-word audio tracks.

11. The method of claim 1, wherein multiple genres of the set of genres can be stored for at least one media item of the plurality of media items.

12. A computer system associated with a media-providing service, comprising:
one or more processors; and
memory storing one or more programs for execution by the one or more processors, the one or more programs comprising instructions for:
storing metadata for a plurality of media items, including, for each respective media item of the plurality of media items, at least one genre from a set of genres associated with the plurality of media items;
for a user of the media-providing service:
determining a distribution of interests of the user, including a distribution of genres of media items in the user's listening history;
generating a network graph configured to represent a calibrated media item selection task with respect to the distribution of interests, including the distribution of genres of the media items in the user's listening history, wherein the network graph includes:
a source node;
a sink node;
a layer of nodes between the source node and the sink node representing each respective media item of the plurality of media items;
a first set of edges coupled to the layer of nodes that represents respective relevance scores for each respective media item of the plurality of media items; and
a second set of edges between the source node and the sink node that represents the distribution of interests of the user, including the distribution of genres of media items in the user's listening history;
selecting a calibrated set of media items, that is calibrated so as to be proportional to the distribution of genres, from the plurality of media items to recommend to the user based on a determination that the set of media items maximizes a flow through the network graph, using a maximum-flow approach, from the source node to the sink node; and
providing the calibrated set of media items as recommendations to the user.

13. The computer system of claim 12, wherein:
nodes of a plurality of nodes of the network graph are connected by respective edges of a plurality of edges of the network graph, and the one or more programs further comprise instructions for:
determining a respective cost of each respective edge of the first and second sets of edges between the nodes of the plurality of nodes of the network graph.

14. The computer system of claim 12, wherein:
determining that the set of media items maximizes the flow through the network graph includes determining a set of paths that result in a maximum flow from the source node to the sink node.

15. The computer system of claim 13, wherein:
the set of media items has a predetermined number of slots; and
the selecting the set of media items includes selecting a single media item of the set of media items for each slot of the predetermined number of slots.

16. The computer system of claim 15, wherein:
the network graph includes a plurality of first nodes between the source node and the sink node, wherein each first node of the plurality of first nodes represents a respective slot of the predetermined number of slots; and
the network graph includes a plurality of second nodes between the source node and the sink node, wherein each second node of the plurality of second nodes represents a candidate media item of the plurality of media items.

17. The computer system of claim 16, wherein:
the network graph includes a plurality of third nodes between the second plurality of nodes and the sink node, wherein each third node is connected to a single second node of the plurality of second nodes.

18. A non-transitory computer-readable storage medium storing one or more programs configured for execution by a computer system associated with a media-providing service, the one or more programs comprising instructions for:
storing metadata for a plurality of media items, including, for each respective media item of the plurality of media items, at least one genre from a set of genres associated with the plurality of media items;
for a user of the media-providing service:
determining a distribution of interests of the user, including a distribution of genres of media items in the user's listening history;
generating a network graph configured to represent a calibrated media item selection task with respect to the distribution of interests, including the distribution of genres of the media items in the user's listening history, wherein the network graph includes:
a source node;
a sink node;
a layer of nodes between the source node and the sink node representing each respective media item of the plurality of media items;
a first set of edges coupled to the layer of nodes that represents respective relevance scores for each respective media item of the plurality of media items; and
a second set of edges between the source node and the sink node that represents the distribution of interests of the user, including the distribution of genres of media items in the user's listening history;
selecting a calibrated set of media items, that is calibrated so as to be proportional to the distribution of genres, from the plurality of media items to recommend to the user based on a determination that the set of media items maximizes a flow through the network graph, using a maximum-flow approach, from the source node to the sink node; and
providing the calibrated set of media items as recommendations to the user.

* * * * *